L. A. ASPINWALL.
POTATO PLANTER.
APPLICATION FILED JULY 27, 1912.
1,085,588.
Patented Feb. 3, 1914.
2 SHEETS—SHEET 1.
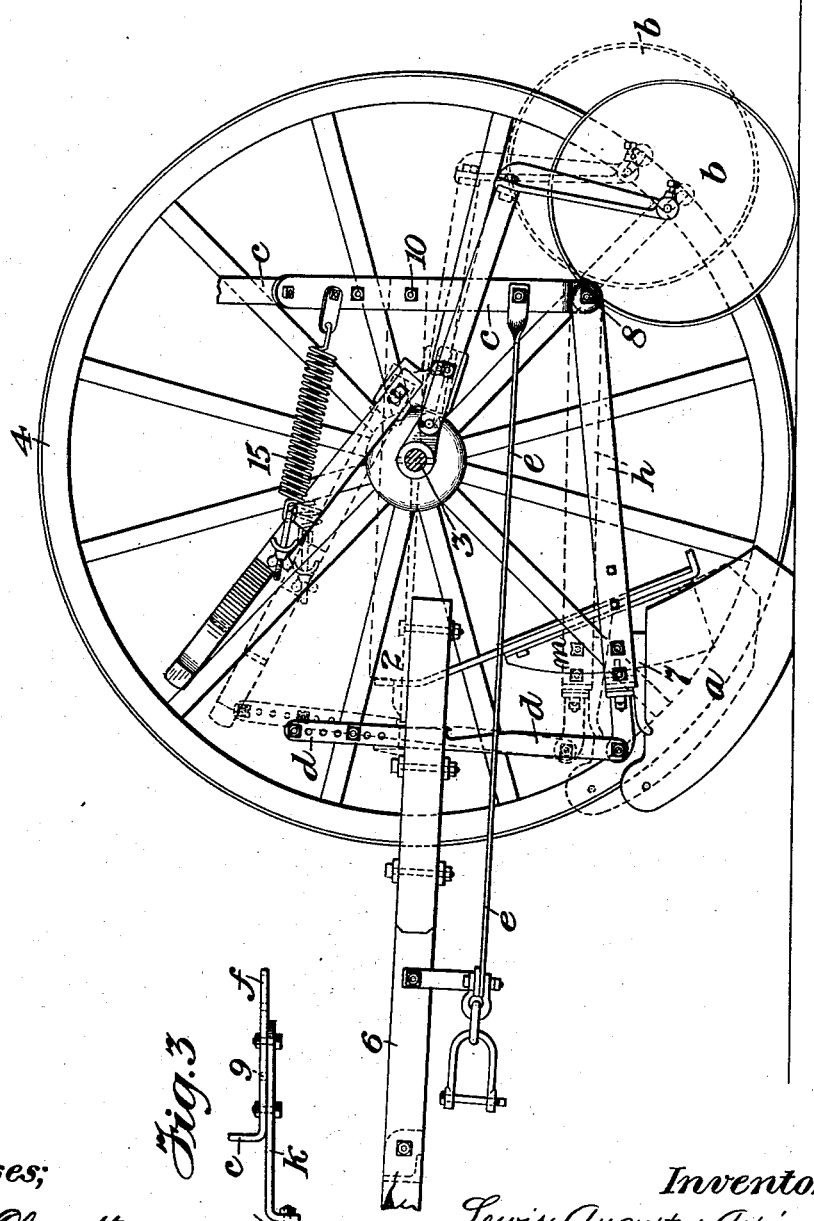
Witnesses:
Chas. F. Clagett
Geo. T. Pinckney
Inventor,
Lewis Augustus Aspinwall
By Serrell & Son
his Attorneys,

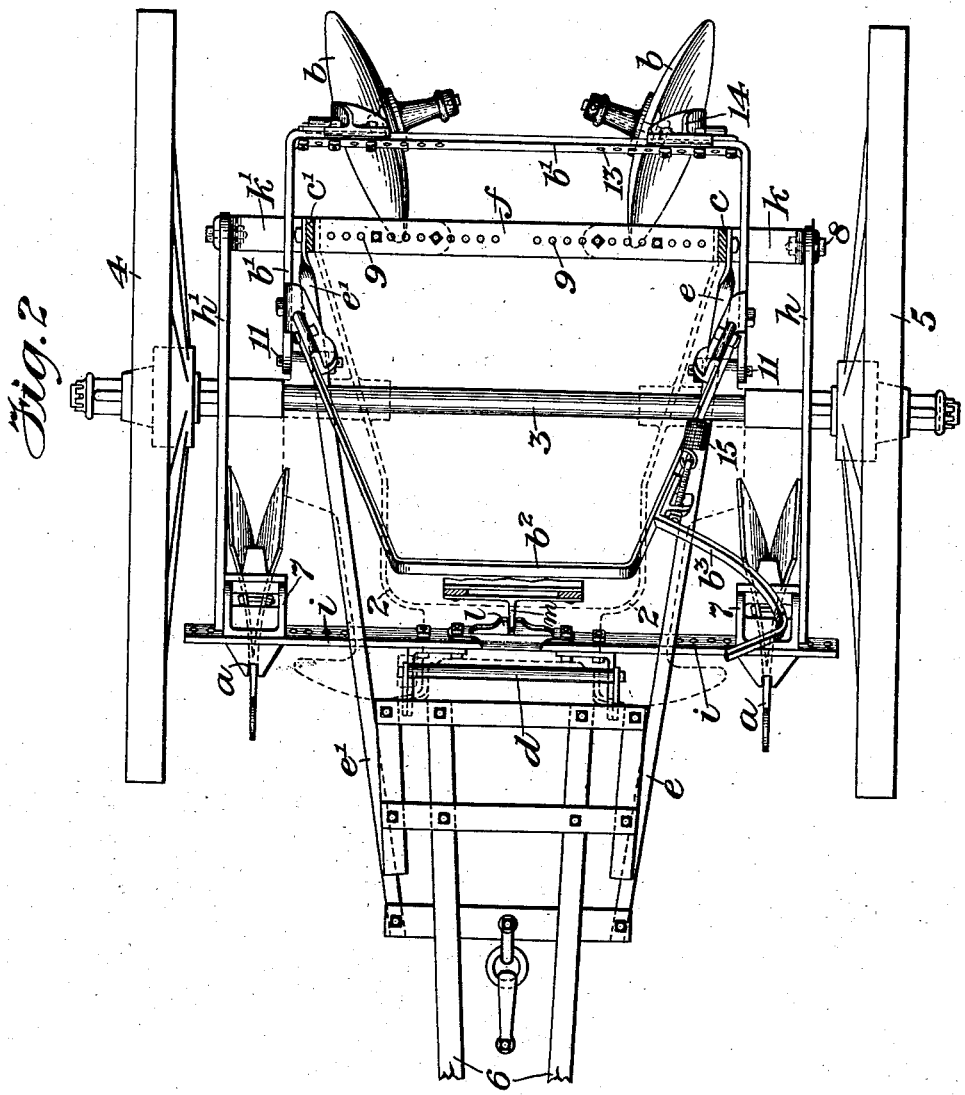

UNITED STATES PATENT OFFICE.

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

POTATO-PLANTER.

1,085,588.  Specification of Letters Patent.  Patented Feb. 3, 1914.

Original application filed February 17, 1912, Serial No. 678,320. Divided and this application filed July 27, 1912. Serial No. 711,784.

*To all whom it may concern:*

Be it known that I, LEWIS AUGUSTUS ASPINWALL, a citizen of the United States, residing at Jackson, in the county of Jackson and State of Michigan, have invented a certain new and useful Improvement in Potato-Planters, of which the following is a specification.

My present invention relates to improvements upon the potato planting devices shown and described in Letters Patent heretofore granted to me, and particularly to Patent No. 864,595, dated August 27, 1907, and the same is a division of my Letters Patent No. 1,059,810, dated April 22, 1913.

My present invention relates particularly to the furrow openers and coverers, and the object of the same is to increase the efficiency of the structures heretofore employed by me, particularly with reference to making the potato planter adaptable for planting two parallel rows of potatoes simultaneously and thus capable of performing double work.

In the structure of my present invention, and in combination with the essential devices heretofore employed by me in the machines of my aforesaid patents I employ companion furrow openers, supporting devices therefor on which the furrow openers are adjustable so as to obtain the desired distance between the rows, means for raising and lowering the furrow openers, and means for obtaining a transverse rigidity of the furrow openers.

The coverers are supported by devices that may be raised and lowered and held in an elevated position, and the coverers are adjustable on their supports, also according to the distance between the rows, all of which is hereinafter more particularly described.

In the drawing, Figure 1 is an elevation at the left-hand side of my improved potato planter, with the left wheel removed and showing only just so much of the mechanism associated with the companion furrow openers and coverers as is necessary for the understanding of the invention. Fig. 2 is a plan of the same, and Fig. 3 is a detail hereinafter referred to.

Similar letters and numerals of reference indicate similar parts in all the figures.

There are parts which are illustrated in Figs. 1 and 2 which are necessary to a full and complete understanding of the potato planter, but which form no essential part of the present improvement or invention, such parts being similar to what I have heretofore shown in my aforesaid patents. These parts comprise the frame 2; the main axle 3; the wheels 4 and 5, and the divided pole 6.

$a$ $a$ represent the furrow openers or plows, and $b$ $b$ the coverers. These devices are in pairs so as to provide two furrow openers or plows for opening the earth to plant the seed potatoes in two parallel rows and with relation to the coverers, so as to deliver the earth over the potatoes and cover the furrows. These devices are adjustable and may be specially positioned and are specially supported, so as to provide furrows for receiving the potatoes directly beneath the place of delivery by the delivery devices which form the subject of a co-pending application herewith.

$c$ and $c^1$ are vertical frame members which are secured to the main body of the potato planting device, and which at their upper ends are adapted to support the hopper devices employed by me, and which form the subject of a separate co-pending application. These frame members come at opposite sides of their supports and are provided with a cross bar $f$, so that the parts $c$ $c^1$ and $f$ form a frame of U-shape. This stiffens these members for the parts that are connected thereto and for the draft of the machine. The cross bar $f$ between the upright parts $c$ $c^1$ is provided with a series of holes 9, as shown in Fig. 2.

$e$ and $e^1$ are draft bars connected respectively to the upright frame member $c$ $c^1$ and extending forward, and at their forward ends they are connected to pulling devices for the animals hauling the potato planter. The location of this draft attachment serves to equalize the draft, eliminating the weight which would otherwise be upon the horses' necks. It will be noticed that this draft device is pivoted to the upright frame parts $c$ $c^1$ not only below the main frame, but below a point of considerable weight, so that in pulling the machine, the draft thereon has a lifting tendency which overcomes the downward resistance both of the weight and the furrow openers as the same are in operation, and the pressure is not on the animals so much in pulling the machine when in operation as it is upon the axle and wheels where it belongs.

The furrow openers or plows $a$ $a$ are connected to bridge parts or heads 7, and to these parts side bars $h$ $h^1$ are secured at their forward ends. The bridge parts or heads 7 are also connected to a front bar or cross bar $i$. This bar is perforated so that the heads 7, with their furrow openers, may be connected along said bar $i$ in an adjustable relation, according to the widths desired for the parallel rows in which the potatoes are to be planted. The rear ends of the side bars $h$ $h^1$ are connected by pivot bolts 8 to short bars $k$ $k^1$. These short bars are perforated for bolts which connect the same in an adjustable relation to the cross bar $f$, hence the cross bar $f$, the short bars $k$ $k^1$, the side bars $h$ $h^1$, the front bar $i$, and the bridge parts or heads 7 form a rigid frame capable of adjustment for the width of rows, and in this adjustability it is to be presumed that the side bars $h$ $h^1$ will be maintained parallel in all cases.

The side members $c$ $c^1$ may be secured to the frame 2, of the machine, or to the sides of a suitable magazine of the machine by bolts 10.

I have shown at the center of the front bar $i$ a lift bar $d$, by which the furrow openers or plows may be raised and lowered and may be held in a raised position off of the ground, when the planter is being conveyed from place to place. I have also shown connected to this cross bar $i$ a notched plate $l$, and connected in a rigid relation to the front of the machine, a segment plate $m$, which is received in the notch of the notched plate $l$, and by which devices any possible transverse motion of the furrow openers or plows under tension is prevented. These devices also stiffen the whole structure so that the making of accurate parallel furrows is facilitated, that is, furrows in straight lines. These furrow openers $a$ $a$ are not wide but are of about the form shown in Figs. 1 and 2, suitably connected by bolts to the bridge parts or heads 7, which are, as hereinbefore stated, adjustable along the front cross bar $i$.

The coverers $b$ $b$ are at the rear of the potato planter. Their function is to deliver the soil over the potatoes as deposited in the furrows made by the furrow openers, said coverers forming a ridge of earth over the potatoes as deposited. These coverers are connected to frame members 14 carrying spindles upon which the coverers turn, and they are connected by said frame parts 14 and bolts in an adjustable relation to a U-shape strap frame $b^1$, said strap frame being provided with holes 13 to provide for this adjustable relation. This strap frame $b^1$, at the forward ends, is connected to the main frame of the machine by pivots 11, and I provide an inversely positioned U-shape frame $b^2$, at its rear ends connected through a fastening member to the forward ends of the strap frame $b^1$, the frame $b^2$ rising above the axle of the forward part of the machine in advance of the usual position occupied by the operator of the machine. Upon one side of this frame $b^2$, is a projecting foot lever $b^3$, and I provide a spring 15 at its rear end connected to one of the frame members $c$ or $c^1$ and at its forward end connected at one side of the frame $b^2$, and at its end provided with a tensioning device.

By means of the foot lever, the operator can swing the frames $b^2$ $b^1$ on the pivots 11 and raise the coverers off the ground. When the foot is released, the coverers come against the ground, and the spring 15, by virtue of its contractile action tends to force the coverers into the ground and keep them there, so as to make their work more effectual.

While the furrow openers or plows $a$ $a$, and the coverers $b$ $b$ co-act, the one to open the earth and permit the potatoes to fall into the furrows, and the other to cover the earth over the furrows, these parts, as hereinbefore explained, are separate, both from an adjustable and lifting standpoint, and in moving the potato planter from a place of storage to the field, it is always desirable to lift the furrow openers and also the coverers off the ground. The operator may manually lift the bar $d$ to raise the furrow openers above the ground and by placing his foot on the lever $b^3$ may also, and at the same time, if necessary, raise the coverers above the ground and by suitable means may secure both the furrow openers and the coverers in their raised positions while turning the machine at the end of each row or while moving the machine from field to field.

I claim as my invention:

1. The combination in a potato planter with a supporting frame, of a frame connected therewith and depending therefrom rearward of the axle and extending below the plane of the axle, draft bars connected to said frame below the plane of the axle and extending forward to a substantially common point, and devices connected to the forward ends of said draft bars, and to which the animals pulling the machine are harnessed, whereby the line of draft tension comes below the axle of the wheels to assist and to relieve the weight otherwise coming upon the necks of the animals.

2. The combination in a potato planter with a supporting frame, of vertical frame members secured thereto and extending below the plane of the axle and a cross bar connecting the same so that said frame is of substantially U-shape, and the cross bar provided with a series of perforations, short bars underlying the cross bar and adapted for adjustable connection therewith by bolts at the perforations, side bars pivotally connected to the outer ends of the latter bars and extending forward, furrow openers or plows connected to the forward ends of said side bars, a front bar perforated at its respective ends, and means for adjustably connecting the furrow openers to the said front bar, whereby the distance apart of the said furrow openers may be adjusted and varied to provide for the desired width of the rows of potatoes to be planted.

3. The combination in a potato planter with a supporting frame, of vertical frame members secured thereto and extending below the plane of the axle and a cross bar connecting the same so that said frame is substantially U-shape, and the cross bar provided with a series of perforations, short bars also provided with perforations underlying the cross bar and adapted for adjustable connection therewith by bolts at the perforations, side bars pivotally connected to the outer ends of the latter bars and extending forward, furrow openers connected to the forward ends of the said side bars, a front bar perforated at its respective ends, means for adjustably connecting the furrow openers to said front bar, whereby the distance apart of the said furrow openers may be adjusted and varied to provide for the desired width of the rows of potatoes to be planted, and devices connected to said front bar and extending to a point of support on the main frame of the machine, whereby the furrow openers and the frame members to which they are connected, may be raised and lowered or supported as desired.

4. The combination in a potato planter with a supporting frame, of vertical frame members secured thereto and extending below the plane of the axle and connected by a cross bar so that said frame is substantially of U-shape, and the cross bar provided with a series of perforations, short bars also provided with perforations underlying the cross bar and adapted for adjustable connection therewith by bolts at the perforations, side bars pivotally connected to the outer ends of the latter bars and extending forward, furrow openers connected to the forward ends of the said side bars, a front bar perforated at its respective ends, means for adjustably connecting the furrow openers to said front bar, whereby the distance apart of the said furrow openers may be adjusted and varied to provide for the desired width of the rows of potatoes to be planted, a notched plate secured to the center of the aforesaid front bar and a segment plate secured to a part of the frame of the machine with its edge occupying a position in the notch of said bar without interfering with any possible vertical movement of the furrow openers and the devices to which they are connected, whereby the said notched plate and segment plate act to overcome any tendency to a lateral movement in the furrow openers under the tension of use.

5. The combination in a potato planter with a supporting frame, of two furrow openers, bridge parts or heads to which they are connected, side bars connected at their forward ends to the bridge parts, devices connecting the rear ends of said side bars in a pivoted adjustable relation to the said supporting frame, a front frame, means for connecting the same in an adjustable relation to the bridge parts or heads of the furrow openers, and means for raising the furrow openers above the ground and holding them in a suspended position.

6. The combination in a potato planter with a supporting frame, of two furrow openers, bridge parts or heads to which they are connected, side bars connected at their forward ends to the bridge parts, devices connecting the rear ends of said side bars in a pivoted adjustable relation to the said supporting frame, a front frame, means for connecting the same in an adjustable relation to the bridge parts or heads of the furrow openers, means for raising the furrow openers above the ground and holding them in a suspended position, and means associated with the supporting devices of the furrow openers and the main frame of the machine, whereby any tendency to lateral motion of the furrow openers is overcome and prevented.

7. The combination in a potato planter with a supporting frame, of two furrow openers located at either side of the longitudinal center of the machine, suitable frame supports for the said furrow openers, means connected therewith for adjusting the position of the furrow openers and for varying the distances between rows for planting potatoes, a notched plate connected to the forward part of the frame of the furrow openers, and a segment plate connected to and supported by the potato planter and received in the notch of the notched plate for overcoming any tendency to lateral motion and vibration.

8. The combination in a potato planter with a U-shaped supporting frame at its forward ends pivoted to the main frame of the machine, of two coverer devices located at either side of the longitudinal center of the machine, frames having spindles upon which the coverers are mounted, means for connecting said frames in an adjustable relation to said U-shaped supporting frame, a second U-shaped frame inversely positioned with reference to the main U-shaped frame and at its free ends connected therewith, and said latter frame rising in the potato planter and extending forward of the main axle, and a foot lever connected therewith, whereby the operator, by foot pressure, may raise the coverers off the ground and hold them securely in such position.

9. The combination in a potato planter with a U-shaped supporting frame at its forward ends pivoted to the main frame of the machine, of two coverer devices located at either side of the longitudinal center of the machine, frames having spindles upon which the coverers are mounted, means for connecting said frames in an adjustable relation to said U-shaped supporting frame, and a contractile spring for holding said coverers against the ground so as to insure the efficient operation thereof.

10. The combination in a potato planter with a U-shaped supporting frame at its forward ends pivoted to the main frame of the machine, of coverer devices located at either side of the longitudinal center of the machine, frames having spindles upon which the coverers are mounted, means for connecting said frames in an adjustable relation to the said U-shaped supporting frame, a second U-shaped frame placed inversely with reference to the main U-shaped frame and at its free ends connected therewith, the said second U-shaped frame extending forward of the main axle, and means connected with the said second U-shaped frame whereby the operator may move the same to raise the coverers off the ground and support them in a raised position.

Signed by me this 17th day of July 1912.

LEWIS AUGUSTUS ASPINWALL.

Witnesses:
C. G. ROWLEY,
GEO. N. WHITNEY.